May 24, 1960   W. A. GUZELL   2,937,675
SAWHORSE TOOL CARRIER

Filed Nov. 7, 1956   2 Sheets-Sheet 1

INVENTOR.
WALTER A. GUZELL
BY Charles Richard Werner
ATTORNEY

May 24, 1960     W. A. GUZELL     2,937,675
SAWHORSE TOOL CARRIER
Filed Nov. 7, 1956     2 Sheets-Sheet 2
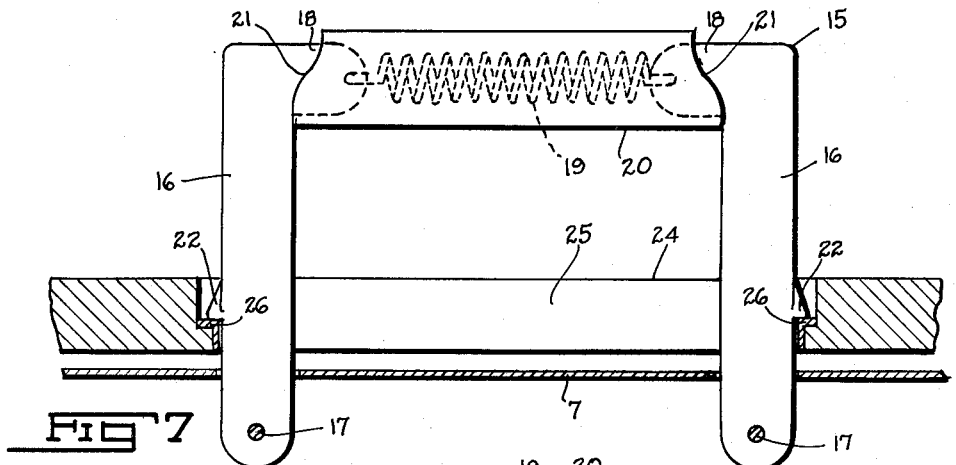
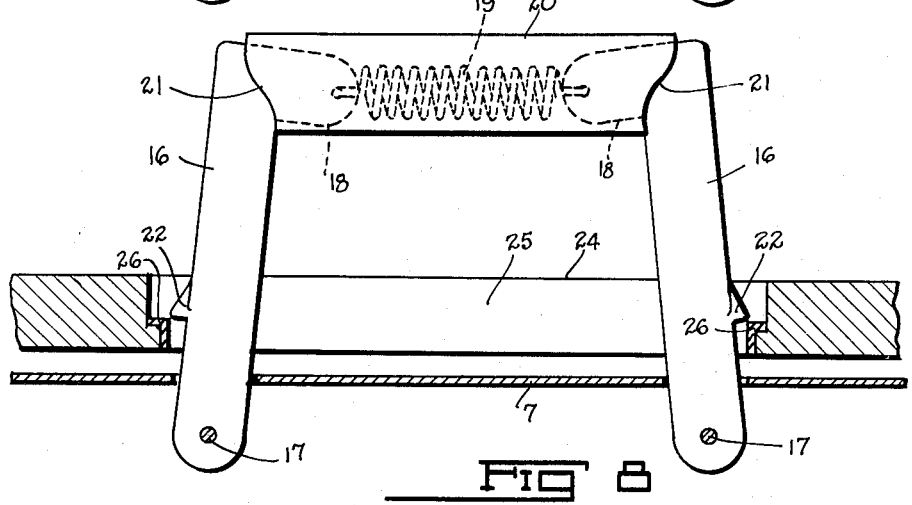
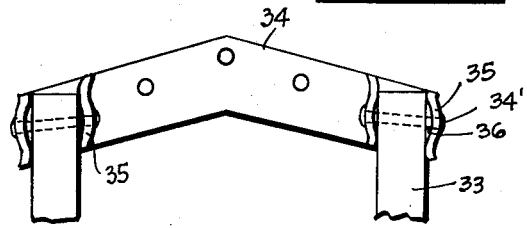
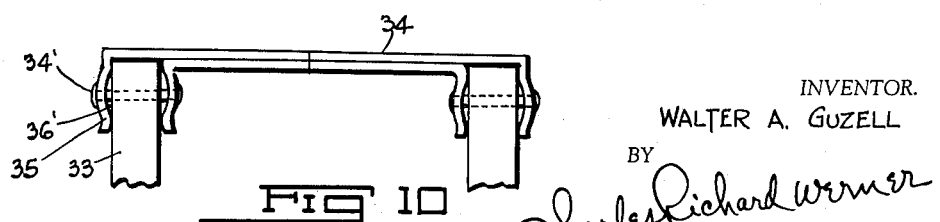
INVENTOR.
WALTER A. GUZELL
BY Charles Richard Werner
ATTORNEY

United States Patent Office 2,937,675
Patented May 24, 1960

2,937,675
SAWHORSE TOOL CARRIER
Walter A. Guzell, 2453 W. Hirsch, Chicago, Ill.
Filed Nov. 7, 1956, Ser. No. 620,846
5 Claims. (Cl. 144—285)

This invention relates in general to receptacles and in particular to a craftsman's sawhorse tool carrier in which the sawhorse forms a removable cover for the tool receptacle.

Along with a tool carrier a sawhorse is a very important part if a carpenter's tools and equipment, and the common type of sawhorse is quite bulky and heavy to carry around from job to job. Quite often carpenters make new sawhorses each time they start on a job and then abandon them when the job is completed.

It is the primary object of my invention to provide a sawhorse tool carrier having a tool receptacle with a removable cover which forms a sawhorse, the legs of the sawhorse being foldable into the cover when it is in covering position on the tool receptacle.

A second object of my invention is to provide a tool receptacle with a removable cover having folding legs, the cover being so designed as to be extremely sturdy and capable of supporting loads well in excess of its normal expected load.

Third; to provide a tool receptacle formed in a new and novel way from lightweight, but strong, durable material with a plurality of trays, shelves and walls for the carrying of various tools.

Fourth; to provide a cover for the tool receptacle formed of strong, lightweight material and so shaped as to be exceptionally sturdy and having a top plate extending from end to end upon which the craftsman can rest material to be sawed etc.

Fifth; to provide a handle on the tool receptacle and a slotted opening in the cover, and means, including the handle for locking the cover on the tool receptacle.

Sixth; to provide a locking handle for a tool carrier with a removable sawhorse cover in which the grip portion of the handle is rotated to provide a cam action for urging locking members into locking engagement with the cover.

Seventh; to provide clamp members on the cover for retaining the legs in supporting position or in the cover in folded position when the cover is not being used as a sawhorse.

Other objects and advantages, as well as the construction and operation of my invention will be better understood by reference to the following description in connection with the accompanying drawings in which:

Fig. 7 is an enlarged detailed side elevational view of the handle in locked position, certain portions of the cover and tool receptacle being shown in section.

Fig. 8 is a similar view with the handle in unlocked position.

Fig. 9 is an enlarged bottom plan view of one of the leg supporting members.

Fig. 10 is an end view of the supporting member shown in Fig. 9, a fragmentary part of the legs being shown.

Figure 1:
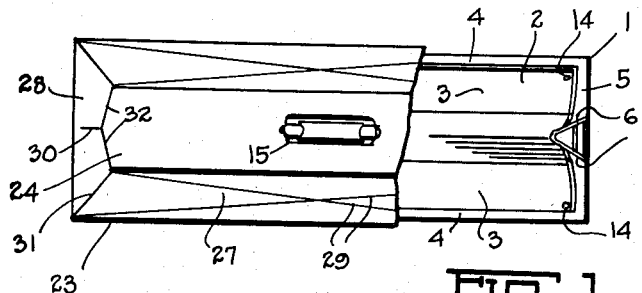
Fig. 1 is a top plan view of the sawhorse tool carrier, parts being broken away for clarity of illustration.
Figure 2:
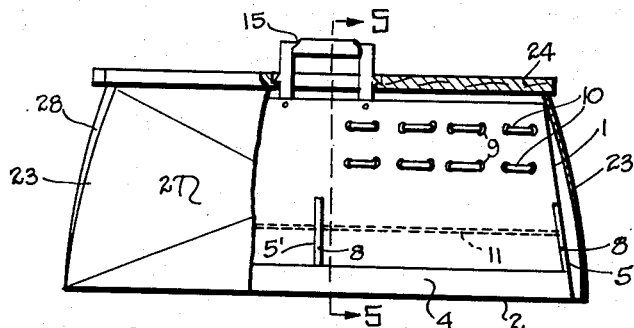
Fig. 2 is a side elevational view of the same with parts shown in section.
Figure 3:
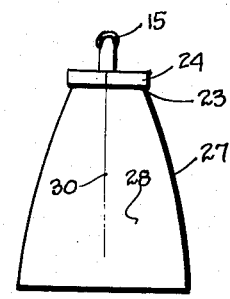
Fig. 3 is an end view of the sawhorse cover over the tool receptacle.
Figure 4:
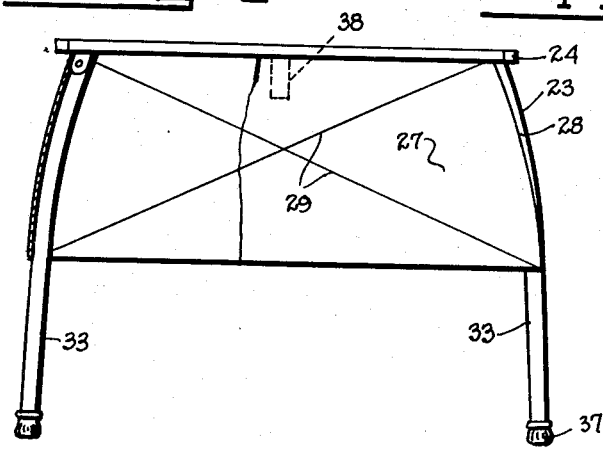
Fig. 4 is a side elevational view of the cover being used as a sawhorse, portions of the cover being broken way to show the leg construction.
Figure 5:
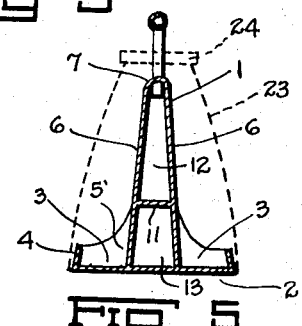
Fig. 5 is a vertical cross sectional view on the line 5—5 of Fig. 2 with the cover position shown in dotted outlines.

Referring now to the drawings by numerals of reference, 1 designates a tool receptacle or carrier having a bottom 2, parallel spaced side trays 3 formed by low sides 4, ends 5 and spaced upstanding walls 6 extending angularly upward from the bottom 2 and terminating in an arcuate top portion 7. The ends 5 and intermediate stiffener 5' between low sides 4 and walls 6 have flanges 8 for additional rigidity. The walls 6 may be provided with a plurality of openings 9 in which cords or thongs 10 may be used to hold various tools, or any other suitable means may be employed to support a large number of tools on the walls 6 where they are easily accessible for quick selection; where the sharp edges will not be dulled or damaged, and where missing tools can be quickly detected.

A horizontal divider 11 is positioned between the walls 6 intermediate the bottom 2 and the top 7 forming two compartments 12 and 13 for the reception of saws and the like. Each tray 3 may be provided with suitable drain openings 14 permitting discharge of any accumulated water.

The top 7 of the tool receptacle 1 carries a handle 15 comprising a pair of spaced arms 16 suitably pivoted to the tool carrier or receptacle at 17, the upper part of the arms having projecting portions 18, a spring 19 being secured to the projecting portions and normally urging the arms 16 toward each other. A hand grip 20 is positioned on the projecting portions 18 and each end of said hand grip has a cam surface 21 bearing against the arms 16 which may be tubular in cross section.

The arms 16 are each provided with a projecting lug 22 for the purpose hereinafter specified.

The sawhorse cover 23 comprises a top 24 preferrably made of wood and having a central slotted aperture 25 through which handle 15 projects, metal strike plates 26 being provided at each end of the aperture 25 against which lugs 22 will strike and bear when the cover 23 is seated over the tool carrier. The aperture 25 serves also as a handle grip when the cover 23 is to be moved or lifted.

The cover 23 is composed of sides 27 and ends 28, suitable breaks or bends 29 and 30 giving added strength to the cover. I have shown the corners 31 curving outwardly, this also strengthening the cover. The top 24 of the cover 23 may have angular ends 32 with the cover ends 28 shaped to fit, the break 30 starting at the midpoint of the angular ends 32.

A plurality of legs 33 are pivotally carried inside the cover 23 on pivot brackets 34 mounted at each end adjacent the top 24, pins 34' passing through each leg and through depending lugs 35 which have a curvature as shown at 36 in Fig. 9 conforming with the curve of the leg for gripping the leg when in vertical supporting position, lugs 35 also being curved at 36' as shown in Fig. 10 for holding the legs when in folded position. The legs 33 may be slightly curved to fit snugly into the corners 31, downward pressure on the top 24 forcing the legs 33 against said corners, the entire structure being exceptionally sturdy and rigid with no danger of collapsing. The legs 33 may terminate in nonslip rubber tips 37.

Figure 6:
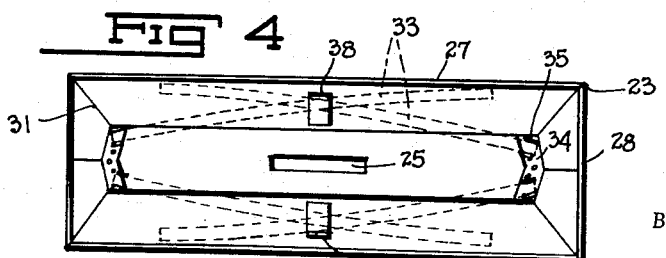
Fig. 6 is a bottom plan view of the cover showing the position of the legs when folded.

When the legs are folded up as shown in Fig. 6, they may be received in resilient leg clamps 38 approximately midway between the ends of the top 24, the legs being free of the tool receptacle whereby the cover can be dropped over the tool receptacle and locked thereto by means of handle 15 in aperture 25.

With the handgrip 20 in unlocked position the arms 16 will be pulled toward each other by the spring 19 and the cover 23 will be fitted over the tool carrier with the handle 15 easily entering the aperture 25. With the cover in proper position the hand grip is turned 180°, the cam surface 21 forcing the arms 16 away from each other whereby lugs 22 will engage the metal strike plates 26 adjacent the aperture 25 of cover 23, the hand grip 20 locking the cover in place until removal is desired.

The cover 23 with legs extended serves as a sawhorse of conventional height and length, and with the legs folded can be used as a step stool for various jobs in which a carpenter does not need the height afforded by a sawhorse. The tool receptacle can remain under the sawhorse in many instances and can be sheltered from the weather by the cover. The sawhorse, of course, may be used to support the tool receptacle if it is desired to rest same on the sawhorse.

The tool receptacle is extremely rigid because of its manner of braced construction and therefore can be made of relatively light material such as ribbed aluminum, fibre glass, plastics and the like.

From the foregoing it will be seen that I have provided a new and novel sawhorse tool carrier in which the tool receptacle cover is removable and has folding legs which, upon extension, form a sturdy, full size sawhorse, the tool receptacle having a handle lockably related to the sawhorse cover.

Obviously, changes in form, proportion and details of construction may be resorted to without departing from the spirit of my invention, and I reserve all rights to such changes as come within the scope of these specifications and the claims which follow.

What I claim as new and desire to secure by Letters Patent is:

1. A sawhorse tool carrier comprising a tool receptacle, a removable cover for the tool receptacle, said cover being adapted to form a sawhorse when removed from the tool receptacle, the tool receptacle comprising a bottom, a pair of spaced elongated trays, a pair of spaced upstanding walls extending from the bottom and forming tool carrying walls, vertically disposed open ended tool compartments formed between the upstanding walls, and handle and locking means on the tool receptacle projectable through the removable cover retaining the cover on the tool receptacle when the device is not in use.

2. A tool receptacle comprising a bottom, a pair of spaced upstanding walls located along the central longitudinal axis of said bottom, said upstanding walls being joined at their upper ends, tool receiving means on said walls, a flange along each edge of the bottom parallel with the upstanding walls, end flanges between the first mentioned flanges and the upstanding walls, the walls and flanges forming parallel tool receiving trays disposed outwardly of said walls, the end flanges curving upwardly toward the upstanding walls, and a horizontal cross member between the upstanding walls at the point where the curved end flanges meet said walls forming a brace and shelf member, the length of the upstanding walls, the tool receptacle being open at the ends thereof between the spaced upstanding walls, the spaced walls and cross member and bottom forming tool receiving compartments between the upstanding walls accessible from the ends of the tool receptacle.

3. A sawhorse tool carrier comprising a tool receptacle, a removable cover for the tool receptacle, said cover being adapted to form a sawhorse when removed from the tool receptacle, a handle on the tool receptacle, an aperture in the sawhorse adapted to register with the handle, said handle comprising a pair of spaced rockable arms, each arm being pivotally secured at its lower end to the upper part of the tool receptacle and swingable toward and away from each other, a locking dog on each arm, a hand grip rotatable about its longitudinal axis and longitudinally positioned between the upper ends of said arms a spring normally urging the upper end of said arms into intimate engagement with the hand grip and in alignment with the longitudinal axis of the hand grip, oppositely disposed offset portions in the removable cover in alignment with the locking dogs, one position of the hand grip forcing the dogs into locking position, rotation of the hand grip about its longitudinal axis 180° from locking position unlocking the dogs from the offset portions for release of the handle from the sawhorse cover.

4. A combination sawhorse tool carrier, including a tool receptacle, a removable cover for the tool receptacle adapted to form a sawhorse when removed from the tool receptacle, said cover having arcuately and outwardly disposed corner configurations, a leg for each arcuately disposed configuration of the cover, the upper portion of each leg having a curvature identical with the corner configurations, each leg being pivotally mounted within the cover adjacent a corner of the cover and swingingly movable into supporting position and in intimate contact with its respective corner configuration of the cover when said cover is used as a sawhorse, and handle means on said tool receptacle projectable through an opening in said removable cover when the device is used as a tool carrier.

5. The structure as specified in claim 4, the portion of each leg below the cover when said legs are in supporting position being substantially vertical.

References Cited in the file of this patent

UNITED STATES PATENTS

| | | |
|---|---|---|
| 540,807 | Andrews | June 11, 1895 |
| 1,268,124 | Jennings | June 4, 1918 |
| 1,404,266 | Brouner | Jan. 24, 1922 |
| 1,479,209 | Topp | Jan. 1, 1924 |
| 2,094,805 | Meier | Oct. 5, 1937 |
| 2,412,395 | Goosmann | Dec. 10, 1946 |
| 2,419,587 | Parks | Apr. 29, 1947 |
| 2,663,338 | Fray | Dec. 22, 1953 |
| 2,727,543 | Polselli | Dec. 20, 1955 |
| 2,740,517 | Evans | Apr. 3, 1956 |